3,549,733
METHOD OF PRODUCING POLYMERIC PRINTING PLATES
Jack R. Caddell, Landenberg, Pa., assignor to E. I. du Pont de Nemours and Company, Wilmington, Del., a corporation of Delaware
Filed Dec. 4, 1968, Ser. No. 781,160
Int. Cl. B29c 17/08
U.S. Cl. 264—25                     23 Claims

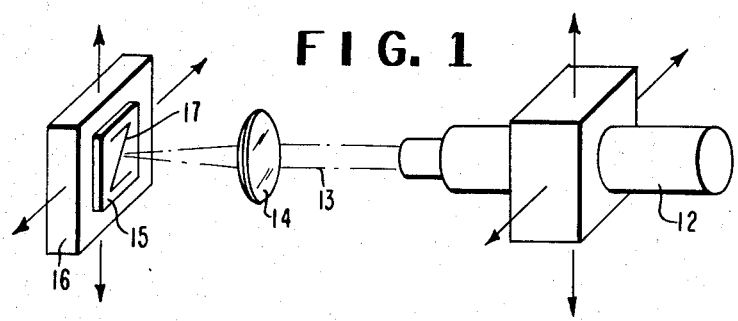
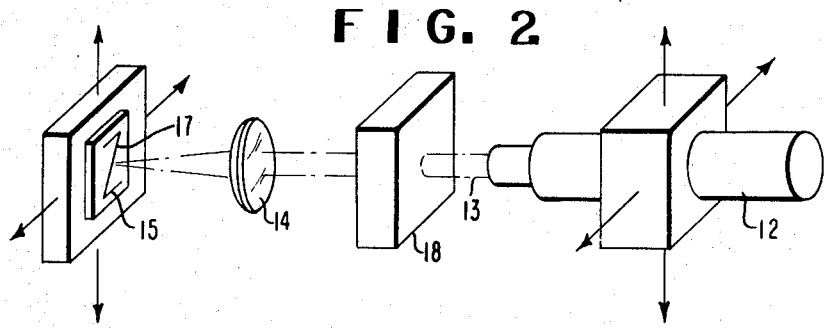
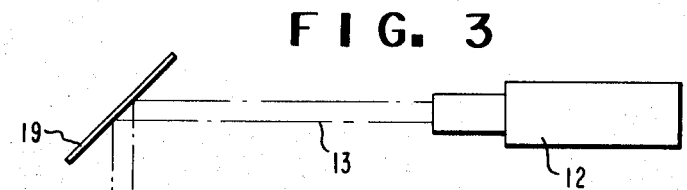
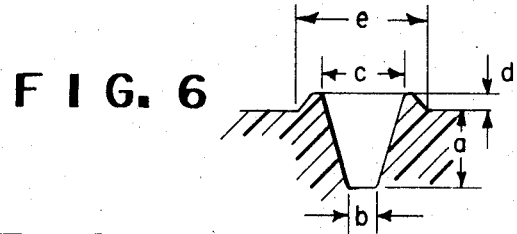
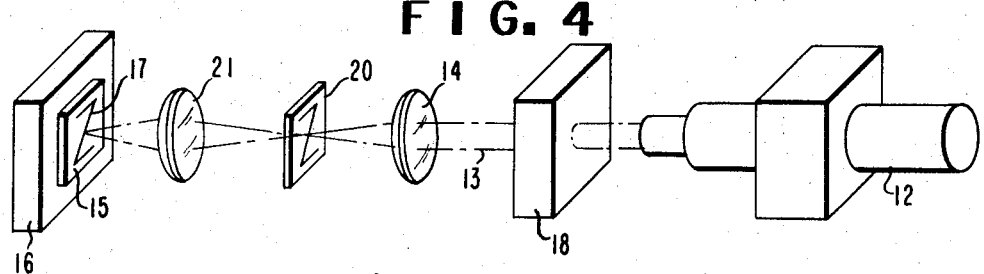
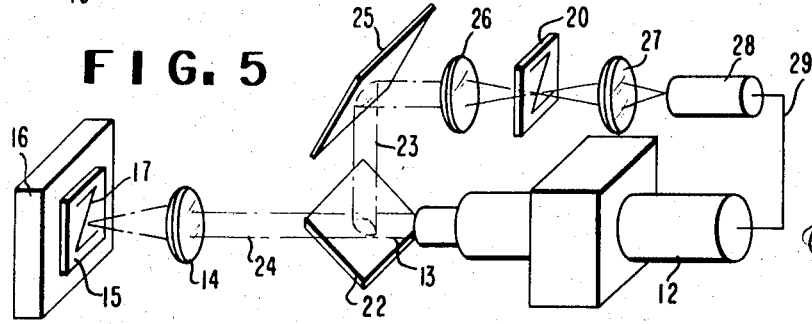
INVENTOR
JACK R. CADDELL
ATTORNEY United States Patent Office 3,549,733
Patented Dec. 22, 1970

ABSTRACT OF THE DISCLOSURE

A method for producing a polymeric printing plate by subjecting a plate, the surface of which is uniformly and substantially composed of a solid polymer selected from the group consisting of homopolymers of a unit and copolymers having a substantial number of units of the general unit formula:

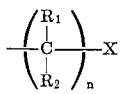

where $n$ is an integer having a value of at least one, X is selected from the group consisting of sulfur and oxygen, and $R_1$, $R_2$ are each selected from the group consisting of H, F, Cl, $CF_3$ and $CCl_3$; to a controlled laser beam of sufficient intensity to decompose the polymers and form depressions in the surface of the plate. The depth of the depression can be selectively varied by modulating the intensity of the incident laser beam, and the pattern engraved in the surface can be controlled by moving the plate or the laser, by deflecting the laser beam, or by placing a mask or transparency between the laser and the plate.

BACKGROUND OF INVENTION

There are numerous ways to engrave the surface of a material. The effectiveness of a particular technique, however, depends on the type of material to be engraved and the proposed use for the engraving. In the printing industry with its tremendous output, for example, the simplest method—hand engraving—is much too expensive and time consuming to be widely used. Also, hand engraving usually results in ridges being formed around the engraved region which renders the engraving unacceptable for use as printing plates because these ridges trap ink which eventually builds up to the point where it smears or blurs the printed image. Consequently, printers have almost universally adopted chemically etched metal printing plates. These plates still require excessive time and effort to produce, however, and are often irregular because of the uncontrollability of the etching process.

The present invention relates to a method for making printing plates by engraving the surface of a polymer with a laser beam. Such plates can be made quickly and inexpensively, and because of the precision with which laser beams can be controlled, sharp engravings can be produced. Since laser engraving of any material, particularly a polymer, generally proceeds by melting and results in depressed areas surrounded by ridges, the material to be engraved and the conditions under which the engraving is to take place must be carefully selected if the engraved plate is to be useful as a printing plate.

SUMMARY OF INVENTION

In the present invention a printing plate is produced by subjecting a plate the surface of which is uniformly and substantially composed of a solid polymer selected from the group consisting of homopolymers of a unit and copolymers having a substantial number of units of the general unit formula:

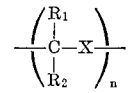

where $n$ is an integer having a value of at least one, X is selected from the group consisting of sulfur and oxygen, and $R_1$, $R_2$ are each selected from the group consisting of H, F, Cl, $CF_3$ and $CCl_3$; to a controlled laser beam of sufficient intensity to decompose the polymers and form depressions in the surface of the plate. The process is operable even if the polymer contains a small amount of impurity, and in some cases, the process is operable even if the polymer is not of the group specified if the polymer is filled with between 20 to 50% by weight of fiber glass or rutile composition. The depth of the depression can be selectively varied by modulating the intensity of the incident laser beam, and the pattern engraved in the surface can be controlled by moving the plate or the laser, by deflecting the laser beam, or by placing a mask or transparency between the laser and the plate. In some instances when the laser would destroy the mask the laser beam can be split, one part being used to engrave the surface of the polymer, and the other being used to monitor the surface of a mask and control the first part in conformance with the monitored signal.

For a better understanding of the present invention reference is made to the following figures:

FIG. 1 is a schematic diagram of one possible embodiment of an apparatus that can be used to produce a printing plate;

FIG. 2 is a schematic diagram of another possible embodiment of an apparatus that can be used to produce a printing plate;

FIG. 3 is a schematic diagram of a third possible embodiment of an apparatus, including scanning means, which can be used to produce a printing plate;

FIG. 4 is a schematic diagram of a fourth possible embodiment of an apparatus which can be used to reproduce the image of a template or a transparency on a printing plate;

FIG. 5 is a schematic diagram of a fifth possible embodiment of an apparatus which can be used to reproduce the image of a template or transparency on a printing plate, and FIG. 6 is a cross-section diagram of the type of depression that a device such as that of FIG. 1 will produce in a plate.

DISCUSSION OF THE DRAWINGS

In FIG. 1, laser 12 produces a beam of coherent radiation 13 which is focused by lens 14 onto the surface of a polymeric sample plate 15 which rests on support stage 16. Either the laser or the support stage can be adapted to move in a controlled manner so that the beam of focused radiation can be made to engrave the desired trace in the surface of the sample plate.

The choice of laser depends largely on the necessary energy content or intensity of the beam. Almost any solid state, liquid or gaseous laser can be used. The $CO_2$ laser is particularly suitable because of its high level of efficiency and its high intensity output. The laser can be adapted to emit either a pulsed or continuous wave (CW) beam. If the laser emits a CW beam, the energy incident on a particular portion of the sample can be varied by either varying the output of the laser, or by varying the rate at which the laser beam moves relative to the sample. For many types of lasers, however, high intensity output is not possible under CW operation. Such lasers are often operated in a pulsed mode. Even if a laser capable of CW operation is used, a pulsed beam may be desirable. Such a beam can be produced by chopping the laser beam with a chopping device 18 placed between the laser and the plate as shown in FIG. 2. This chopper can be a slotted rotating disc, a Kerr cell, or any other chopping device known to those skilled in the art. Alternatively, the laser itself can be pulsed by a method such as Q-switching. If a pulsed beam is used, the energy incident on a particular portion of the sample can be varied by varying the output of the laser, the rate and duration of the pulse, or the rate at which the laser beam moves relative to the sample. The particular details of the laser light source are not given since these sources are well known to those skilled in the art. One suitable laser is Model 40 $CO_2$ gas laser manufactured by Coherent Radiation Laboratories.

Lens 14 is illustrated as a refracting lens. It should be apparent, however, that a reflecting and focusing mirror could be used in place of the lens if desired. In any event, the focusing device can be of either fixed or variable focus. If a lens is used, the lens must be transparent to the wavelength of the laser beam, otherwise absorbed energy will cause discoloration and perhaps cracking of the lens material. One suitable lens for use with the laser designated above is Model LS-20 (2½ inch effective focal length) made by Coherent Radiation Laboratories.

The present invention can be used to engrave a surface of any convenient shape. In all of the discussion this surface is referred to as a plate, which connotes flatness, but the term is used in the sense of a printing plate, which can include a gravure cylinder or a surface of almost any shape. The surface of the plate is uniformly composed of the materials discussed below. By this it is meant that the plate is normally composed of a single material throughout. In some cases, where greater stability is required, the plate can be a composite of one of the polymeric materials discussed below on a suitable backing, such as metal. If such is the case, the thickness of the polymer must be such that the laser doesn't burn through the coating. The entire depression is to be contained in the polymeric surface.

The term engraving generally means to form a depressed area in the surface of a material. It should be apparent that the procedure described herein is also applicable to drill a hole directly through the material, or to etch away a surface material to expose a layer of a different material below. In this discussion the term engrave shall be construed to include all such possibilities. The distinguishing feature of the present invention is not the depth of the depression or generally what type of structure lies beneath the surface of the material, but rather that the surface of the material is ridge free.

The engraving 17 can be produced in numerous ways. As shown in FIGS. 1 and 2 the laser can be stationary and the surface to be engraved 15 can be mounted on a movable stage which is programmed to execute the movement necessary to trace out the desired pattern 17. Alternatively, the surface can be immobile, and the laser and associated focusing lenses can be moved. In many instances movement of such bulky structures is not feasible or rapid enough, so both the laser and the surface to be engraved are made immobile, and the laser beam is deflected by using a mirror 19 as shown in FIG. 3. The mirror can be of almost any material which will withstand the intense laser beam; such as polished stainless steel, front surface coated silicon, or front surface coated germanium. One suitable mirror is Model RT-00 made by Coherent Radiation Laboratories. A single mirror with two degrees of rotational freedom can be used so that the laser beam can be moved at will across the surface to be engraved. Alternatively, two mirrors with a single degree of rotational freedom apiece can be used, or a single mirror with a single degree of freedom can be used in conjunction with a moving sample stage. In short, almost any scanning device which will allow the laser to scan the whole surface of the plate is feasible.

Numerous methods can be used to produce the desired trace on the surface to be engraved. The simplest way would be to move the sample stage or laser, as described above, in response to some impulse to physically trace out the desired design. A second way would be to deflect the laser beam, by moving the mirrors, to physically trace out the required design. The mirrors could, for example, be mounted to follow the deflection of a ballistic galvometer. Such techniques would be suitable if the design to be traced on the sample plate were a simple design. It would be difficult, however, to reproduce a complicated design by such techniques. A more effective way to produce a complicated design, or picture, would be to scan the whole surface of the sample, or a portion of it, with the laser beam in much the same way that a television raster is produced. By modulating the laser beam as it scans the plate, depressions could be formed in the desired areas so that a predetermined trace or picture could be reproduced. Black and white images could be re produced by cutting the beam on and off. Gradations could be reproduced by varying the intensity of the incident beam.

Modulation of the laser beam can be accomplished in a variety of ways. The output of the laser could be varied in much the same way that the electron beam in a television tube is modulated, so that in effect a picture could be engraved on the plate utilizing the same type of information that goes into a television receiving set. A simpler way to achieve the same result would be to keep the output of the laser constant and modulate the beam by placing a mask, 20, between the laser and the sample, as shown in FIG. 4. Some suitable imaging devices such as mirrors 14 and 21 would be required, but in any event the image engraved on the plate would correspond to the transparent areas of the mask. Such a mask can be either a template, with openings reproducing the desired image, or a filter where the intensity of the laser beam striking the sample is controlled by the optical density of the filter. To achieve high resolution such a mask would have to be placed in a focused portion of the beam, such as between mirrors 14 and 21 as illustrated in FIG. 4. Since the laser beam has the capacity to burn through many materials, such a mask would have to be constructed from material which would be effectively impervious to the laser beam during the period of its use. This places serious restriction on the type of material from which the mask can be made. Another way to use the laser to reproduce the image on a mask, be it either a template or a filter, would be to use an apparatus such as that shown in FIG. 5. In FIG. 5 the laser beam 13 strikes a semitransparent mirror 22 placed in an unfocused portion of the beam. The semi-transparent mirror is constructed so that only a small portion of the beam 23 is deflected from the main path and the major portion of the beam 24 is available to be focused through lens 14 to be used in engraving the sample 15. The deflected portion of the laser beam 23 can be directed at the template 20, either directly or through deflecting mirrors, such as mirror 25. The light passing through the template is incident on a light detecting means 28, the output of which can be used to modulate the laser beam. This modulation can be accomplished by a feedback loop such as that indicated by lead 29. Alternatively the feedback loop can be connected to a chopping device, such as that discussed above in connection with FIG. 4, placed between the semitransparent mirror 22 and lens 14. Light detecting means 28 can be a photocell or any other suitable device, and the components of the feedback circuit can be of any type known to those skilled in the art. Since the deflecting beam is unfocused, for high resolution, some sort of focusing system such as that provided by lens 26 and 27 is necessary. In this case, since only a small portion of the laser beam is being utilized, masks which would ordinarily be destroyed by the full laser beam can be employed. As in FIG. 4 such a mask can be either a template or a filter, and in this case the filter can be a photographic transparency, where gradations in the opacity of the transparency are reproduced on the plate by gradations in the depth and/or diameter of the depressions. The template would be effective in the case of moderately simple black and white designs. A simple transparency would suffice for black and white photographs. Three or four transparencies would be required to produce the three or four printing plates required if color printing is contemplated.

All of the above techniques are applicable in the process of making printing plates by laser etching the surface of a material. It is conceivable that the printing plate be made from any material, such as a metal, or combination of materials, such as a coated metal, but the present invention relates to the production of polymeric printing plates. When a well focused high intensity laser beam is incident on a polymeric plate, a depression is formed in the plate. This depression has a cross section as shown in FIG. 6. The depression has a depth $a$, which is dependent upon the amount of energy supplied to that portion of the plate, and a width $b$, at the bottom of the depression, which relates to the diameter of the hottest portion of the beam. As noted above, the depression can extend all the way through the material, so that $a$ is also determined by the thickness of the material and not only on the intensity of the beam. At the surface, the depression has a larger width $c$, which relates to the total diameter of the beam. Generally, the depression is formed by the process of melting and vaporization, so that a ridge is formed around the depression, extending a distance $d$ above the surface of the plate, and extending a distance beyond the edge of the depression so that there is a total width $e$ to the area of the material affected by the laser beam. This ridge is formed from the molten material by surface tension.

If the engraved material is to be used as a printing plate, the presence of the ridge renders the plate unacceptable because ink applied to the plate has a tendency to hang up on the ridges and blur or smear the printed image. In addition, if a picture or tightly spaced design is to be engraved, the molten material from one depression flows over into the neighboring depression, partially filling it, so that the resultant plate does not accurately reproduce the desired picture. Finally, a printing plate with well defined regular edges will produce sharper prints than a plate having rounded edges.

Ideally, the printing plate should have no ridges around the depressions. The plate should be smooth, except in the area of the depression which should have sharp regular edges. One way in which this can be achieved is to use a laser with high enough intensity to vaporize the plate material without melting it. While workable, this solution has several disadvantages. First of all the higher the intensity of the laser the higher the cost. Second, even if a laser with sufficient intensity to vaporize the material without melting it were used, it would be virtually impossible to vaporize the material without some melting on the periphery where the intensity of the beam is lower than it is in the center of the beam. Under the best of circumstances some rounding of the edges would occur. Finally, it would be virtually impossible to produce a plate with a variation in the depth of the depression corresponding to gradation in the picture to be reproduced by modulating the intensity of the incident beam. As soon as the intensity of the beam was decreased, melting would occur. To vary the depth of the depression, the scanning rate would have to be varied. This is at best a cumbersome technique.

There are some polymers, however, which appear to be in a class by themselves. Ridgeless depressions can be engraved in these polymers under conditions which will not cause the same type of depression in most other polymers.

Delrin® Acetal resin, which is ether "end-capped" polyoxymethylene with a molecular weight above 10,000, is an example of such a polymer. In Table I the geometrical parameter of a depression etched in a plate made from "Delrin" is compared with the same parameters of holes drilled in plates made from the following materials: Lucite® 148 acrylic resin, which is a copolymer of less than 10% ethyl acrylate with methylmethacrylate: Zytel® 101 nylon resin, which is the copolymer poly(hexamethylene adipamide); Alathon® 34 polyethylene resin, which is polyethylene; and Teflon® FEP fluorocarbon resin, which is a copolymer of tetrafluoroethylene and hexofluoropropylene. The depressions were formed in each case by a Coherent Radiation Laboratory Model 40 $CO_2$ laser operated at 30 watts in the $TEM_{00}$ mode for a 10 msec. pulse. The parameters are the same as those of FIG. 6.

TABLE I

|  | a | b | c | d |
|---|---|---|---|---|
| "Delrin" | 0.025" | 0.008" | 0.010" | 0 |
| "Lucite" | 0.030" | 0.008" | 0.012" | 0.002" |
| "Zytel" |  |  | 0.010" | 0.003" |
| "Alathon" | 0.010" | 0.020" | 0.011" | 0.0012" |
| "Teflon" FEP | 0.030" | 0.006" | 0.012" | 0.0001" |

As can be seen from column $d$, "Delrin" is the only material in the list with no ridge around the depression. All the rest have ridges significant enough to effect the clarity of a printed image.

A large number of other materials were laser engraved and evaluated as printing plates without actual measurement of the depression parameters. From among those tested, only the following appear to yield ridgeless depressions and function as effective printing plates: polychoral, hexafluoroacetone/formaldehyde, hexafluoroacetone/ethylene oxide, and polythiocarbonyl fluoride. It appears that the copolymer polychoral/p-chlorophenyl-isocyanate (95/5 mol percent) is also operable in the invention. These materials come from varied groups of polymers which include homopolymers of acetals, oxyalkylenes and aldehydes and copolymers containing substantial proportions of these monomers. Most of these polymers are long chained, having a backbone of carbon and oxygen emanating from a carbonyl bond of the monomer. Polythiocarbonyl fluoride, however, has a carbon-sulfur backbone emanating from a thiocarbonyl bond in the monomer. These polymers can be characterized as being solid homopolymers of a unit, or solid copolymers having a substantial number of units, of the general formula:

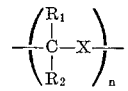

where:

$n$ is an integer having a value of at least one,

X is selected from the group consisting of oxygen and sulfur, and $R_1$, $R_2$ are each selected from the group consisting of H, F, Cl, $CF_3$ and $CCl_3$. $R_1$ and $R_2$ can be identical. It should be noted that in some instances, specifically polyoxymethylene, the polymer may have to be "end capped" to produce a solid.

In addition to homopolymers and copolymers of materials selected from the group described above, it is to be expected that such polymers containing up to 5% of material that does not adversely affect the operability of the polymers used in the invention can be present. That is, at least 95% of the specified polymer in the surface would be expected to be successful in producing the results of this invention.

Materials which generally do not fall within the class of polymers discussed above have been found which also have the desired property of being amenable to the formation of ridgeless depressions. The "Zytel" listed in Table I for example, does not form the desired depression, but if filled with between 20% and 50% by weight of fiber glass or rutile composition the plate can be engraved with a laser to form ridgeless depressions. The precise reason for this is not immediately apparent, but it can be theorized that in some situations, where the structure of the polymer from which the sample is composed is similar to but not identical to the structure described above, the addition of fillers, such as the rutile compositions and fiber glass mentioned above, which act as heat sinks, will localize heating to the point where localized melting followed by vaporization occurs.

What is claimed is:

1. A process for making a printing plate with a working surface substantially free from ridges which comprises:
   (a) subjecting a plate, the surface of which is uniformly and substantially composed of a solid polymer selected from the group consisting of (a) homopolymers of a unit, and (b) copolymers having a substantial number of units, of the general formula:

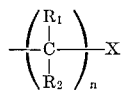

where $n$ is an integer having a value of at least one, X is selected from the group consisting of oxygen and sulfur, and $R_1$ and $R_2$ are each selected from the group consisting of H, Cl, F, $CF_3$ and $CCl_3$; to a focused beam of coherent radiation emerging from a laser having an intensity at least sufficient to decompose and form depressions in said surface;
   (b) varying, in a controlled manner, the point at which the laser beam impinges upon said surface so that a predetermined pattern can be engraved in said surface; and
   (c) controlling the intensity of the impinging laser beam in such manner that the size of the depressions can be selectively varied.

2. The process of claim 1 wherein said surface is uniformly composed of at least 95% by weight of the specified polymer.

3. The process of claim 1 wherein said polymer is polychoral.

4. The process of claim 1 wherein said polymer is a copolymer of hexafluoroacetone/formaldehyde.

5. The process of claim 1 wherein said polymer is a copolymer of hexafluoroacetone/ethylene oxide.

6. The process of claim 1 wherein said polymer is polythiocarbonyl fluoride.

7. A process for making a printing plate with a working surface substantially free from ridges which comprises:
   (a) subjecting a plate, the surface of which is uniformly and substantially composed of ether "end capped" polyoxymethylene having a molecular weight greater than 10,000, to a focused beam of coherent radiation emerging from a laser having an intensity at least sufficient to decompose and form depressions in said surface;
   (b) varying, in a controlled manner, the point at which the laser beam impinges upon said surface so that a predetermined pattern can be engraved in said surface; and
   (c) controlling the intensity of the impinging laser beam in such manner that the size of the depressions can be selectively varied.

8. The process of claim 7 wherein said plate is mounted on a movable stage, and the point at which said laser beam impinges upon said surface is varied by moving the stage in a controlled manner.

9. The process of claim 7 wherein the laser is movably mounted, and the point at which said laser beam impinges upon said surface is varied by moving the laser in a controlled manner.

10. The process of claim 7 wherein both the laser and the plate are immovably mounted, and the point at which said laser beam impinges upon said surface is varied by deflecting the laser beam in a controlled manner.

11. The process of claim 7 wherein said laser beam is a pulsed laser beam and the depth of said depression is controlled by varying the duration, rate and intensity of the pulses incident upon said surface and the rate at which said laser beam moves relative to said plate.

12. The process of claim 11 wherein said laser beam is pulsed by periodically blocking said laser beam.

13. The process of claim 11 wherein said laser beam is pulsed by Q-switching the laser.

14. The process of claim 11 wherein said laser beam is pulsed by modulating the input to the laser.

15. The process of claim 7 wherein said laser beam is a continuous laser beam and the depth of said depression is controlled by varying the intensity of said laser beam and the rate at which said laser beam moves relative to said plate.

16. The process of claim 7 wherein: said laser beam is programmed to systematically traverse the whole, or a specified portion, of said plate; the pattern engraved on the surface of said plate is controlled by a template located between said laser and said plate; and the depth of said depressions is controlled by controlling the intensity of said laser beam and the rate at which said laser beam moves relative to said plate.

17. The process of claim 7 wherein said laser beam is programmed to systematically traverse the whole, or a specified portion, of said plate, and wherein the pattern engraved on the surface of said plate and the depth of said depressions is controlled by the optical density of at least one filter located between said laser and said plate.

18. The process of claim 17 wherein said filter is a transparency.

19. The process of claim 7 wherein:
   (a) said laser beam is split into two unequal parts, the first part of said beam containing substantially all the energy contained in said laser beam, being program to systematically traverse the surface of said plate, and the second part of said laser beam being programmed to systematically traverse the surface of a mask in register with the movement of the first part of said laser beam;
   (b) the pattern engraved on the surface of a plate by the first part of the laser beam is controlled by monitoring the intensity of the second part of the laser beam which passes through said mask, and using this monitored intensity to modulate the first part of said laser beam; and
   (c) the depth of said depression is controlled by controlling the intensity of said laser beam and the rate at which said laser beam moves relative to said plate.

20. The process of claim 19 wherein the mask is a template.

21. The process of claim 19 wherein the mask is a photographic transparency.

22. A process for making a printing plate with a working surface substantially free from ridges which comprises:
   (a) subjecting a plate, the surface of which is uniformly and substantially composed of a solid polymer filled with not less than 20% by weight or more than 50% by weight of rutile composition or fiber glass to a focused beam of coherent radiation emerging from a laser having an intensity at least sufficient to decompose and form depressions in said materials;
   (b) varying, in a controlled manner, the point at which the laser beam impinges upon said surface so that a predetermined pattern can be engraved on said surface; and
   (c) controlling the intensity of the impinging laser beam in such manner that the depth of the depressions can be selectively varied.

23. The process of claim 22 wherein said polymer is poly(hexamethylene adipamide).

References Cited

UNITED STATES PATENTS

| | | | |
|---|---|---|---|
| 2,682,687 | 7/1954 | Franz | 264—80 |
| 2,825,282 | 3/1958 | Gergron | 264—25X |
| 3,246,079 | 4/1966 | Teucher | 178—6.6B |
| 3,374,311 | 3/1968 | Hell | 101—401.1X |
| 3,455,239 | 7/1969 | Smith | 101—401.1X |

ROBERT F. WHITE, Primary Examiner

R. R. KUCIA, Assistant Examiner

U.S. Cl. X.R.

101—401.1; 178—6.6; 264—80, 132, 293

PO-1050
(5/69)

UNITED STATES PATENT OFFICE
CERTIFICATE OF CORRECTION

Patent No. 3,549,733      Dated December 22, 1970

Inventor(s) Jack R. Caddell

It is certified that error appears in the above-identified patent and that said Letters Patent are hereby corrected as shown below:

In the Abstract - column 1, line 18 and in Claim 1 - colume 7, line 21, the formula reading " 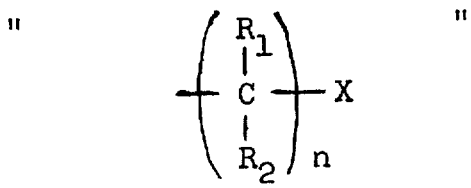 "

should read

-- 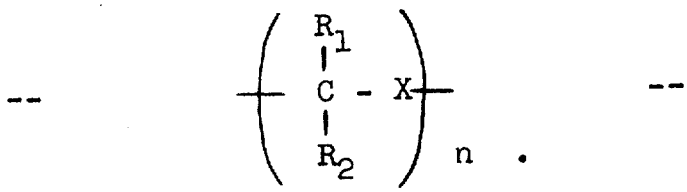 --

Claim 19, column 8, lines 41 & 42, "program" should read --programmed--.

Signed and sealed this 20th day of April 1971.

(SEAL)
Attest:

EDWARD M. FLETCHER, JR.
Attesting Officer

WILLIAM E. SCHUYLER, JR.
Commissioner of Patents